United States Patent [19]

Liska et al.

[11] Patent Number: 4,705,552

[45] Date of Patent: Nov. 10, 1987

[54] GLASSWARE FORMING APPARATUS WITH DISTRIBUTED CONTROL

[75] Inventors: Timothy J. Liska, West Simsbury; Paul F. Scott, Gramby, both of Conn.

[73] Assignee: Emhart Industries, Inc., Farmington, Conn.

[21] Appl. No.: 921,554

[22] Filed: Oct. 21, 1986

Related U.S. Application Data

[63] Continuation of Ser. No. 775,454, Sep. 12, 1985, abandoned.

[51] Int. Cl.⁴ .............................................. C03B 9/40
[52] U.S. Cl. .......................................... 65/158; 65/29;
  65/160; 65/163; 65/DIG. 13; 364/473; 364/476
[58] Field of Search .................. 65/29, 158, 160, 163, 65/DIG. 13; 364/473, 476

[56] References Cited

U.S. PATENT DOCUMENTS

| | | | |
|---|---|---|---|
| 3,905,793 | 9/1975 | Croughwell | 364/473 X |
| 4,247,317 | 1/1981 | Wood et al. | 65/158 X |
| 4,313,750 | 2/1982 | Lulejian et al. | 364/473 X |
| 4,367,087 | 1/1983 | Cardenas-Franco et al. | 65/29 X |
| 4,427,431 | 1/1984 | Mumford et al. | 364/473 X |
| 4,459,146 | 7/1984 | Farkas et al. | 65/163 X |
| 4,529,429 | 7/1985 | Wood | 65/29 |
| 4,548,637 | 10/1985 | Miller | 364/476 X |
| 4,615,723 | 10/1986 | Rodriguez-Fernadez et al. | 65/163 |

Primary Examiner—Arthur Kellogg
Attorney, Agent, or Firm—Arthur B. Moore

[57] ABSTRACT

An improved electronic control system for glassware forming apparatus having a heirarchy of machine level supervisory controllers (including a machine controller and an operator communications controller), section controllers, and individual mechanism controllers. The mechanism controllers may be dedicated to the control of a variety of functions admitting of automated control, such as servo-control of electrical motors, sequencing of solenoid valves, generating alarm signals, etc. The mechanism controllers include separate control programs designed for their associated forming mechanisms, and are subject to on-off timing control in real time from the section level controllers. In general, the machine controller and operator I/O controller handle set-up, operator modifications during operation, and other "non-real-time"interactions with the mechanism controllers; the machine controller also coordinates the operation of a plurality of mechanism controllers in accordance with machine-level parameters.

14 Claims, 18 Drawing Figures

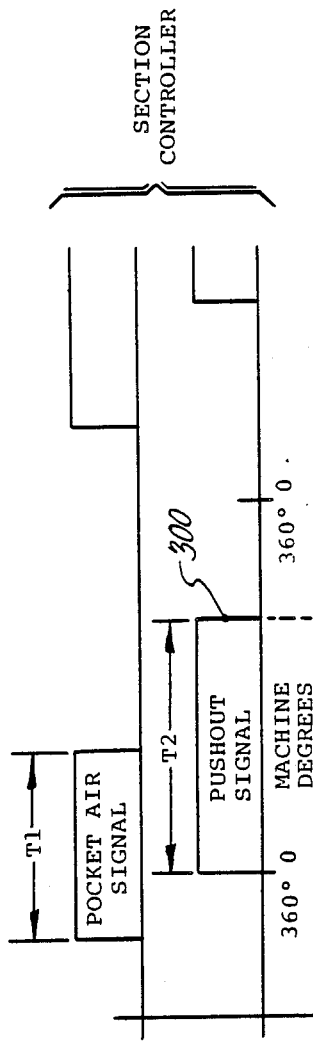
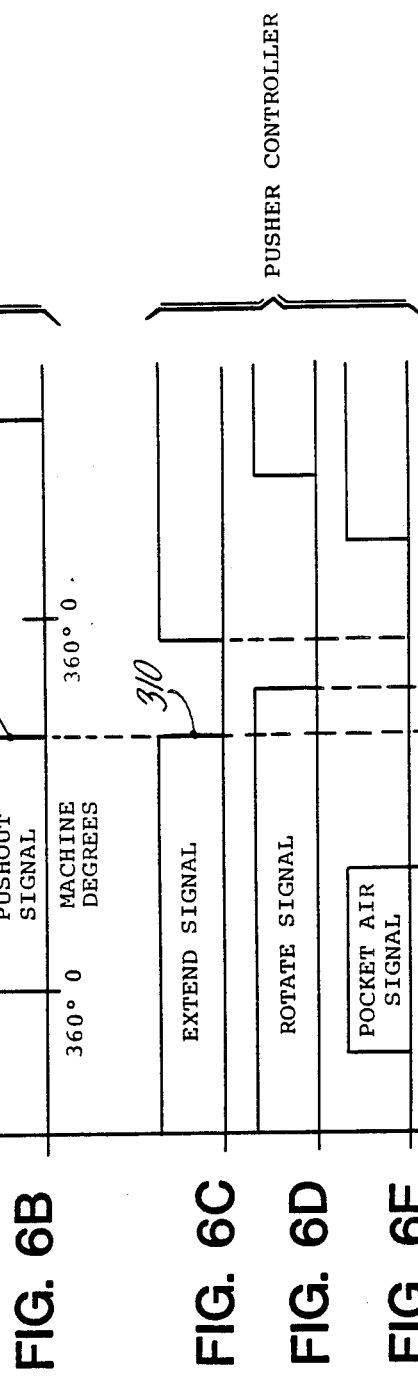
FIG. 6A
FIG. 6B
FIG. 6C
FIG. 6D
FIG. 6E
FIG. 6F

GLASSWARE FORMING APPARATUS WITH DISTRIBUTED CONTROL

This is a continuation of co-pending application Ser. No. 775,454 filed on Sept. 12, 1985, now abandoned.

BACKGROUND OF THE INVENTION

The present invention relates to automated glassware forming apparatus, and more particularly to improved electronic control systems for such glassware forming apparatus.

A widely accepted type of apparatus for forming glassware articles, known as the Hartford I.S. (or "individual section") machine, is exemplified by U.S. Pat. No. 1,979,211. These machines incorporate a master timing cam mounted to a machine drive shaft to actuate various "forming events" during each glassware forming cycle, by controlling various valves to pneumatically operate various mechanisms within each machine section. The specific motion of given mechanisms may be further controlled by cams, pneumatic control mechanisms, and the like. Typically a given I.S. machine includes a plurality of sections (e.g. eight) which are coordinated in the infeed of molten glass from a common gob distributor, and in the removal of formed glassware articles for further processing.

With the advent of electronic process control technology, various improvements to the above machine design have been made in controlling the timing of various forming operations. An initial stage of this adaptation was the replacement of the mechanical timing control of the master cam with digital electronic apparatus which generated actuation pulses for, e.g., solenoid-actuated valve blocks. See, e.g., U.K. Pat. No. 1,079,385. This electronic timing control was tailored to the special processing requirements of the glassware forming process in U.S. Pat. Nos. 3,877,915 and Re. 29,188, which characterized the machine timing by critical thermodynamic milestones of the forming process—i.e. "thermodynamic boundary events". These and other inventions provided increasingly sophisticated machine-level timing control over forming events, machine start and stop functions, and the like.

More recently, such electronic control systems have added an additional heirarchy of section-level controllers; see, for example U.S. Pat. Nos. 4,152,134; 4,247,317; and 4,478,629; and EPC Application No. 84300470.6. Different systems employing such section-level controllers vary in such characteristics as whether the section controllers are capable of independent operation (as opposed to requiring downloading from a supervisory machine controller), and the nature of operator interaction. All of these approaches offer only a limited, on-off control over the operation of given forming mechanisms.

It is also known to provide some degree of feedback control over the mechanisms of an I.S. machine and related machine elements. For example, the system of U.S. Pat. No. 4,108,623 employs feedback sensors in a centrally-oriented control system, which can vary the duration of various timing events in response to the sensor output. Such systems, again, provide only a limited degree of control over given forming mechanisms.

Another recent development in the interest of improved speed, efficiency, and reliability of such glassware forming machines relates to the drive mechanisms for I.S. machine components and related input and output equipment. In lieu of the pneumatic and cam driven mechanisms of traditional glassware forming machines, various servo actuator systems have been incorporated for such mechanisms as the gob distributor, bottle pushout etc. See, e.g., U.S. Pat. Nos. 4,367,087; 3,871,858; 4,456,462; 4,461,637; 4,427,431; and 4,409,013. These devices have not, however, been effectively integrated in a comprehensive electronic control system, but have entailed stand-alone controllers with quite limited interactions with the machine and section controllers.

European Patent Application No. 84105048.7, filed May 6, 1983, discloses a glassware forming machine electronic control system wherein machine components are mechanically linked to digitally responsive motor modules. The digitally responsive motor modules are under control of a component controller which is actuated by a conventional electronic timing control system of the type discussed above. This system is designed for an all-electric glassware forming machine, and does not accommodate a partially pneumatic, partially servomotor drive, machine design. In addition, this system provides only a limited degree of distributed control over various machine functions.

Accordingly, it is a principal object of this invention to achieve improved automation of glassware forming apparatus. A related object is to achieve a higher degree of control over given mechanisms within such apparatus. A further related object is to effectively integrate servo-controlled forming mechanisms within glassware forming machines. Such control system should enjoy a flexible design, permitting selective use of servomotor control, solenoid valve control, and a variety of other electromechanical interfaces.

Another object is to improve user-interaction in an electronic control system. A related object is to improve the physical design of electronically controlled glassware forming machines, thereby to improve the operation environment.

A further object is to improve the efficiency of glassware forming apparatus. As one aspect of this, it is important to reduce "down-time" in the inevitable event of wearing-out of parts, malfunction of mechanisms, etc. Furthermore, it is desirable that a malfunction of given forming mechanism not disable the operation of an entire I.S. machine and be easily diagnosed and serviced.

SUMMARY OF THE INVENTION

In furthering the above and related objects, the invention provides electronic control apparatus for glassware forming machinery which effectively integrates dedicated, mechanism-specific controllers in a system heirarchy. Principal elements of such control system are the mechanism controllers, one or more section controllers, and a machine controller. Advantageously the control system also includes an operator control processor, and input-output devices for operator interaction. Such control systems may be used in conjunction with one or more servo-controlled forming mechanisms, optionally in cooperation with conventional cam and pneumatic drives for other machine components.

According to one aspect of the invention, the dedicated mechanism controllers comprise user-programmable logic elements whch store a control program for one or more operational components of the I.S. machine. The mechanism controller receives user-specified set-up parameters from the machine controller, said set-up parameters being characteristic of the particular machine element and the actions being controlled. The set-up parameters may be entered by the operator using the machine terminal before start-up or modified during operation, and are downloaded from the machine controller to the mechanism controller. The mechanism controller also receives one or more timing signals from the section controller, and processes these signals together with the set-up parameters to generate one or more output control signals to the related operational component.

The machine controller also may receive sensor outputs and other information concerning the mechanism environment, and may transmit this information together with other mechanism status signals to the machine controller for feedback control or operator interaction. For glassware forming mechanisms of sufficient complexity, the mechanism controller may comprise a principal mechanism controller together with subsidiary mechanism controllers which regulate subsystems of the operational component.

Another aspect of the invention relates to the nature of the section and machine controllers of such systems. One or more section controllers produce "timing drum" signals in the manner disclosed, e.g., in copending application U.S. Ser. No. 461,086, filed Jan. 26, 1983, now abandoned i.e. it regulates the on and off times of the section components within the forming cycle. In contrast to the "real time" control provided by the section controllers, the machine controller and operator I/O controllers are responsible for set-up, operator modifications during operation, and other "non-real-time" interactions. The machine controller also coordinates the operation of a plurality of dedicated mechanism controllers.

A further aspect of the invention is the nature of system communication elements. To achieve real-time adaptive control, this system employs bidirectional communications among the mechanism, section, and machine-supervisory controllers, and various input/output devices. Desirably, the system includes an asynchronous communication link between the machine controller and the mechanism controllers, said link most preferably having multidropping capability. A bidirectional link between the machine controller and mechanism controllers passes set-up parameter signals in one direction, and mechanism processor status signals (such as alarm signals) in the other.

In a particular operative embodiment of the invention, each of a plurality of mechanism controllers is dedicated to controlling multiple functions of a corresponding pushout assembly. Controlled functions include the actuation and deactuation of various solenoid valves, and the profile of a stepper motor shaft rotation. Electronic control is accomplished by a pair of outputs—pocket air and pusher start signals—from the section controller to each pushout controller. The timing signals from the section controllers comprise pulses, which are processed by the pushout controller to extract timing information from the pulse widths. The pulse rise times control pushout controller outputs in real time, while the extracted timing data regulate pushout controller outputs in non-real-time.

BRIEF DESCRIPTION OF THE DRAWINGS

The above and additional aspects of the invention are illustrated in the following detailed description of the preferred embodiment, taken together with the drawings in which:

FIGS. 6A–6F are timing diagrams showing time-vs.-voltage plots of various signals of the section controller and pushout controller:

FIG. 6A plots the pocket air signal of the section controller, in machine degrees;

FIG. 6B plots the pushout start signal of the section controller, in machine degrees;

FIG. 6C plots the extend/retract signal of the pusher controller, in pushout degrees;

FIG. 6D plots the cylinder rotate signal of the pusher controller, in pushout degrees;

FIG. 6E plots the pocket air signal of the pusher controller, in pushout degrees; and FIG. 6F plots the pushout cam profile, in pushout degrees;

DETAILED DESCRIPTION

Figure 1:
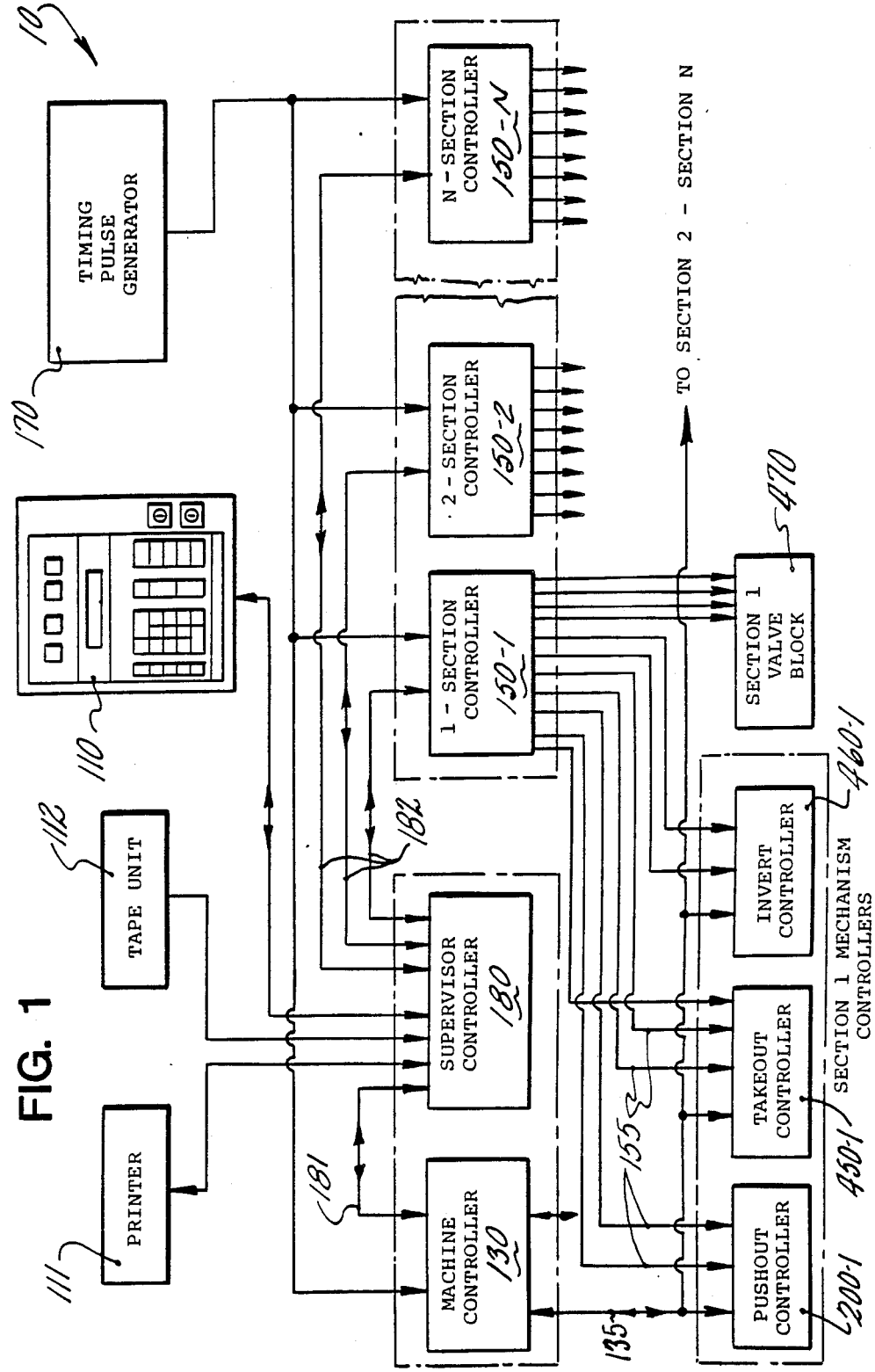
FIG. 1 is a schematic block diagram of a preferred control architecture in accordance with the invention, for control of a glassware forming machine.

Reference should now be had to FIG. 1, which illustrates the system architecture of a distributed control system 10 for glassware forming machines. Control system 10 may be conveniently understood as consisting of a number of subsystems, generally indicated by the dashed lines. Section controllers 150-1, 150-2, . . . , 150-N comprise the real-time, "timing event" portion of the system, including a plurality of individual section controllers typically of the type disclosed in commonly assigned U.S. patent application Ser. No. 461,086, filed Jan. 26, 1983. Each of section controllers 150 is assigned to a different section of an n-section glassware forming machine, typically an "I.S. forming machine". Section controllers 150 and Machine controller 130 receive timing pulses from Timing Pulse Generator 170, to synchronize the operation of the various sections. The phased operation of each section is determined by a program within each controller 150 which offsets its respective starting point by a predetermined amount from the synchronizing pulse. Each Section controller 150 generates a group of "timing drum" outputs defining the respective times within that section's operating cycle when various mechanisms are to be actuated or deactuated, or other actions are to be taken. As shown in FIG. 1, these outputs may be routed directly to valve blocks 470 or other interfacing devices as is typical in the prior art, or may be transmitted to individual "mechanism controllers" 200-1, 450-1, 460-1 etc. for that section. Thus, the real time information from section controllers 150 may be supplied in a format analogous to conventional timing systems for I.S. machines, and a given I.S. machine may combine distributed processing of some section mechanisms with conventional "electronic timing drum" control of other mechanisms.

The machine controller 130 and Supervisor Controller 180 comprise the "non-real-time" portion of system 10. Controller 130 supplies mechanism-specific timing set-up information, ("set-up parameters") during both initial set-up and while running the system. Machine controller 130 includes a resident program to allow it to support the functioning of a variety of mechanism controllers.

Supervisor controller 180 supports operator communication via a machine terminal 110, printer 111, tape unit (mass storage device) 112, or other peripheral devices. Supervisor controller 180 communicates with the machine controller 130 and with the section controllers 150 via bidirectional communications links 181, 182 to deliver parameters entered by the user at terminal 110 or from mass storage unit 112, and to enable the printout and display of data.

A set of mechanism controllers 200-1, 450-1, 460-1 are shown for section 1. In addition to the one-way timing signal channels 155 from section controller 150-1, the mechanism controllers communicate with machine controller 130 via bidirectional data link 135. Data link 135 passes set-up parameter signals from the machine controller 130 to the mechanism controllers, e.g. to download parameters entered at terminal 110. Data link 135 also transmits mechanism controller status signals from the mechanism controllers to machine controller 130, such as alarms, information about the mechanism environment, etc. Advantageously, data link 135 comprises an asynchronous multidrop data line. This mode of transmission simplifies wiring, interconnecting, and installation.

Figure 5:
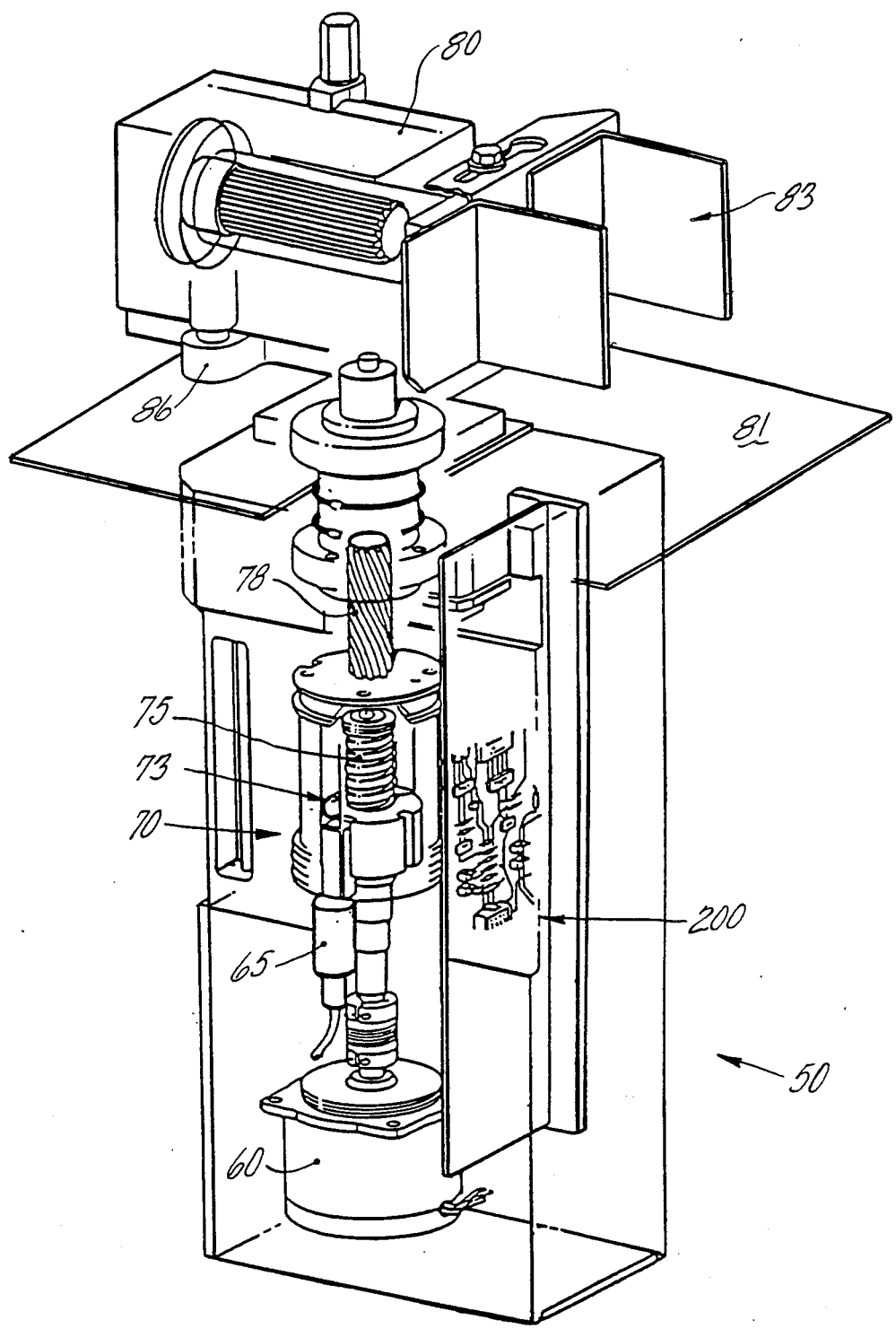
FIG. 5 is a perspective view of a pushout assembly in accordance with commonly assigned U.S. Ser. No. 741,017, filed June 3, 1985, U.S. Pat. No. 4,557,746 incorporating the controller of FIG. 4.

Advantageously, each of the various mechanism controllers for a given section are physically associated with the mechanism which it is designed to control—e.g. pushout controller 200 (FIG. 5). Thus, if a malfunction occurs in a given mechanism, whether mechanisal or electrical, the offending part may be easily removed and replaced.

As illustrated below with respect to pushout control system 100 (FIG. 3), the control architecture of the invention provides many of the well known advantantages of distributed control. The control of each mechanism may be adjusted individually and dynamically, and the controlling processes for each mechanism's actions or motions are easily programmed or changed.

It should be understood that the system architecture of FIG. 1 illustrates the general functional interrelationship between various components of control system 10, and that the block make-up of such system does not necessarily identify discrete hardware modules. For example, a single section controller 150 may be provided for a plurality of machine sections, such controller including means for distinguishing timing outputs for different section. The machine controller 130 and supervisor controller 180 may comprise a single computer, and the machine terminal 110 may be integral with the supervisor controller or the combined supervisor/machine controller. The mechanism controller may consist of a master controller to control principal mechanism actions, and a subservient controller to control a dependent subsystem of the mechanism.

FIGS. 3–8 illustrate a particular embodiment of a dedicated mechanism control system 100 embodying the universal controller architecture of FIG. 1, for controlling a plurality of pushout assemblies. FIG. 5 shows a pushout assembly 50 in accordance with commonly assigned U.S. patent application Ser. No. 741,017, filed June 3, 1985, which is a continuation application based upon U.S. Ser. No. 520,396, filed Aug. 4, 1985, now abandoned. The following explanation of the operation of pushout 50 provides a background for a discussion of the dedicated pushout controller 200. Controller 200 is shown here packaged as a single printed circuit card 201 plugged into an STD bus compatible backpane 52, for convenient installation and maintenance.

Pushout 50 relies upon a combination of pneumatic and electrical power—pneumatically powered pushout/return and extend/retract functions (controlled via solenoid valves), and an electrically controlled pushout profile. Prior to the start of pushout, air is directed to the underside of the piston 71 in rotary actuator 70, upward movement of piston 71 being prevented by nut 73 on lead screw 75. A source of "pocket air" (not shown) has been turned on to assist the nesting of a container in pusher cylinder fingers 83. At the start of a pushout cycle, stepper motor 60 begins to rotate at a rate determined by a pushout profile ("pushout cam"). Nut 73 moves up lead screw 75, allowing piston 71 to move.

A helical splined shaft 78 is fixed to the upper part of piston 71, and engages a helical splined nut (not shown), so that as the shaft 78 passes through the nut it causes the nut to rotate. This rotation is transferred to pusher cylinder 80, thus controlling the sweepout profile. At a variable point prior to completion of sweepout, a solenoid valve (not shown in FIG. 5) switches and retracts the pusher cylinder finger 83, and when this mechanism returns the valve switches again to extend finger 83 over dead plate 81. Another solenoid valve (not shown) switches to turn off the supply of pocket air prior to completion of sweepout.

At the completion of pushout, the solenoid valve (not shown in FIG. 5) controlling the air to piston 71 switches, diverting the air to the upper part of the piston cylinder. The nut 73 on lead screw 75 does not prevent motion in the reverse direction so that piston 71 returns under pneumatic power. Stepper motor 60 is reversed, returning nut 73 to its "home position", where it actuates a proximity sensor 65 to signal completion of the pushout cycle.

Figure 3:
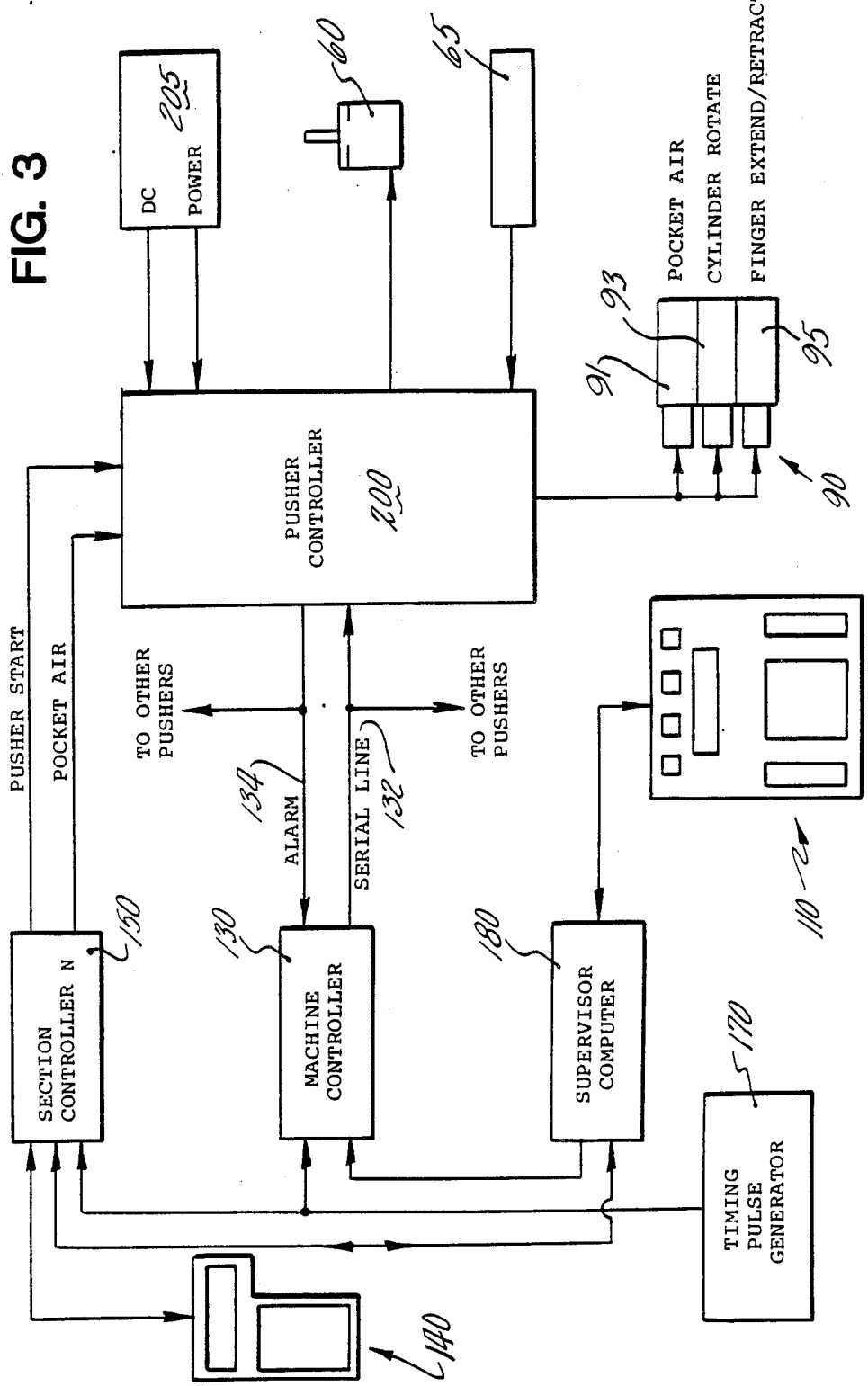
FIG. 3 is a schematic block diagram of a pushout control system in accordance with the invention.

FIG. 3 schematically illustrates at 100 various electronic control elements which act in concert with a given pushout controller 200 for controlling the electrical and pneumatic functions of a given pushout 50. Pusher Controller 200 communicates with Machine controller 130 by a serial multi-drop communications line 132, which is also connected to individual pushout controllers for other sections (not shown), providing asynchronous machine data transmission at 300 baud. All pushout controllers simultaneously receive non-time-critical data common to the whole I.S. machine; there are also individual broadcasts of pushout "cam" profiles. Alarm line 134, illustratively 24 VDC, transmits error messages from the various pusher controllers 200 to machine controller 130, for example to request rebroadcast of information via serial line 132.

Advantageously, section controllers 150 takes the form disclosed in commonly assigned U.S. patent application Ser. No. 461,086 filed Jan. 26, 1983. The Section controller 150 for section N provides a pair of 24 VDC pulse outputs to Pushout Controller 200 to actuate and deactuate time critical pushout functions. The first of these signals is the pocket air signal 300 (FIG. 6A). Its rising edge signals pushout controller to turn on pocket air—i.e. actuate pocket air solenoid valve 91. The width of pulse 300 is then measured and used to calculate when to deactuate pocket air solenoid 91 after pushout 70 has transversed an indicated number of degrees of arcuate motion. The second, "pushout start" signal 310 is interpreted similarly, actuating solenoid 93 and initiating rotation of rotary actuator 70 (FIG. 5) on its rising edge, and retracting fingers 83 by deactuating solenoid valve 95 after a calculated number of degrees based on the width of pulse 310. Details of the control algorithm are explained below.

Advantageously, pocket air solenoid valve 91 is a two way valve which turns pocket air on when energized; cylinder rotate solenoid valve 93 is a four way valve which is deenergized when the pusher cylinder 70 is in its home position; and extent/retract solenoid valve is a four way valve which when energized extends fingers 83.

Timing pulse generator 170 provides a machine synchronization signal once per machine cycle, to Section controller 150 and Machine controller 130. Machine controller 130 measures the time between pulses over a series of consecutive pulses, and recognizes machine synchronization if the pulses are within a valid machine cycle range, and the times between rising edges remain within a permitted variation. If timing signal 170 is lost after synchronization, the pusher timing cycle will continue to run at the last measured cycle time. If the signal returns when controller 200 is in pseudo-synchronization, Machine controller 130 measures the new pulse train and re-synchronizes based on the new signal. As long as the time between rising edges changes by less than the permitted variation, the section controller 150 and pushout controllers 200 remain synchronized.

Alternatively, in the absence of an external sync source 170, the operator may define a pusher timing cycle by entering a cycle timing in Machine Terminal 110.

Figure 2:
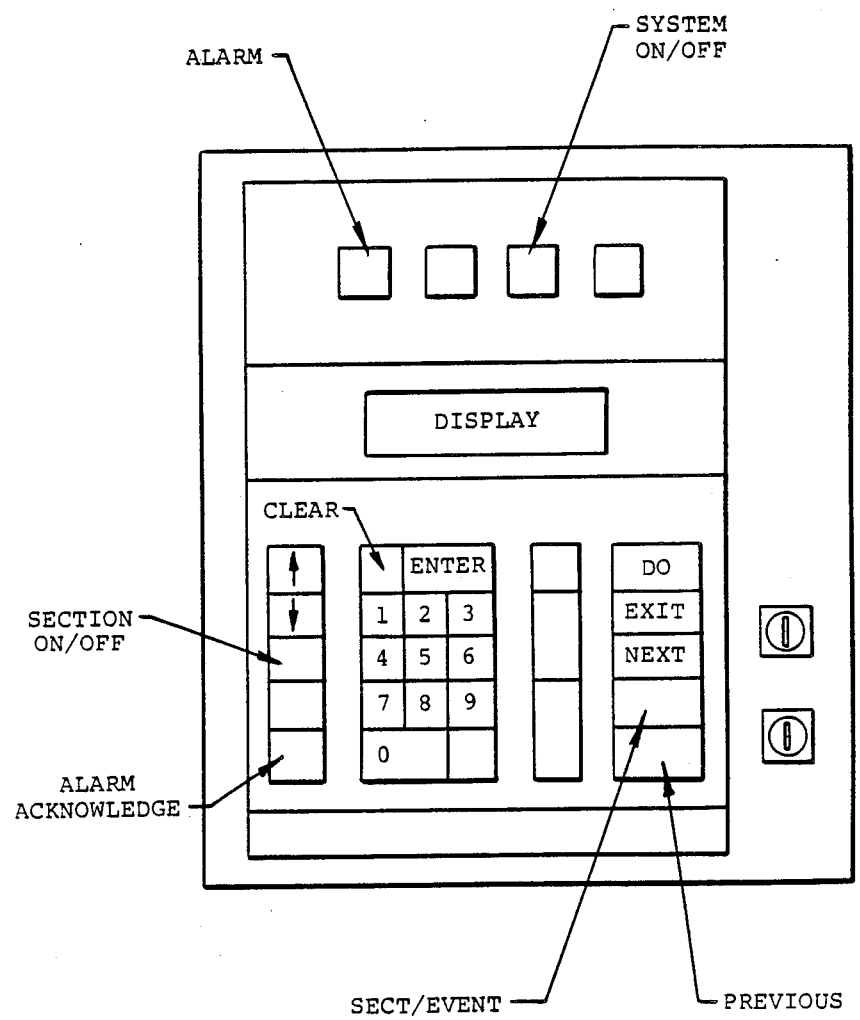
FIG. 2 is a diagrammatic view of the machine terminal shown in FIG. 1.

Supervisor Controller 180 supports operator communication with machine terminal 110 (as well as possibly with other peripheral devices, such as the printer 111 and mass storage unit 112 shown in FIG. 1). As shown in FIG. 2, machine terminal 110 includes a two line display 113 which displays system messages and prompts. The keyboard 115 consists of various numeric and function keys. The DO key causes a selected action to be taken; the NEXT key displays the next node or sub-node title of the menu screens; EXIT returns to the first node; JOG UP and JOG DOWN change the current displayed numeric entry by a constant amount; ENTER enters the current displayed numeric information into the database of Supervisor Controller 180; CLEAR clears information just entered without changing controller values; and Section/Event allows access to a Section controller 150. Machine terminal 110 is used both to enter initial parameters to be downloaded into pushout controller 200, and to modify these parameters (possibly during system operation). Machine terminal 110 is adapted to operator supervision of multiple mechanism controller by including an appropriate set of menu screens for each mechanism controller. Menu screens may also be provided for machine components interfaced via valve block 470 (FIG. 1).

Figure 4:
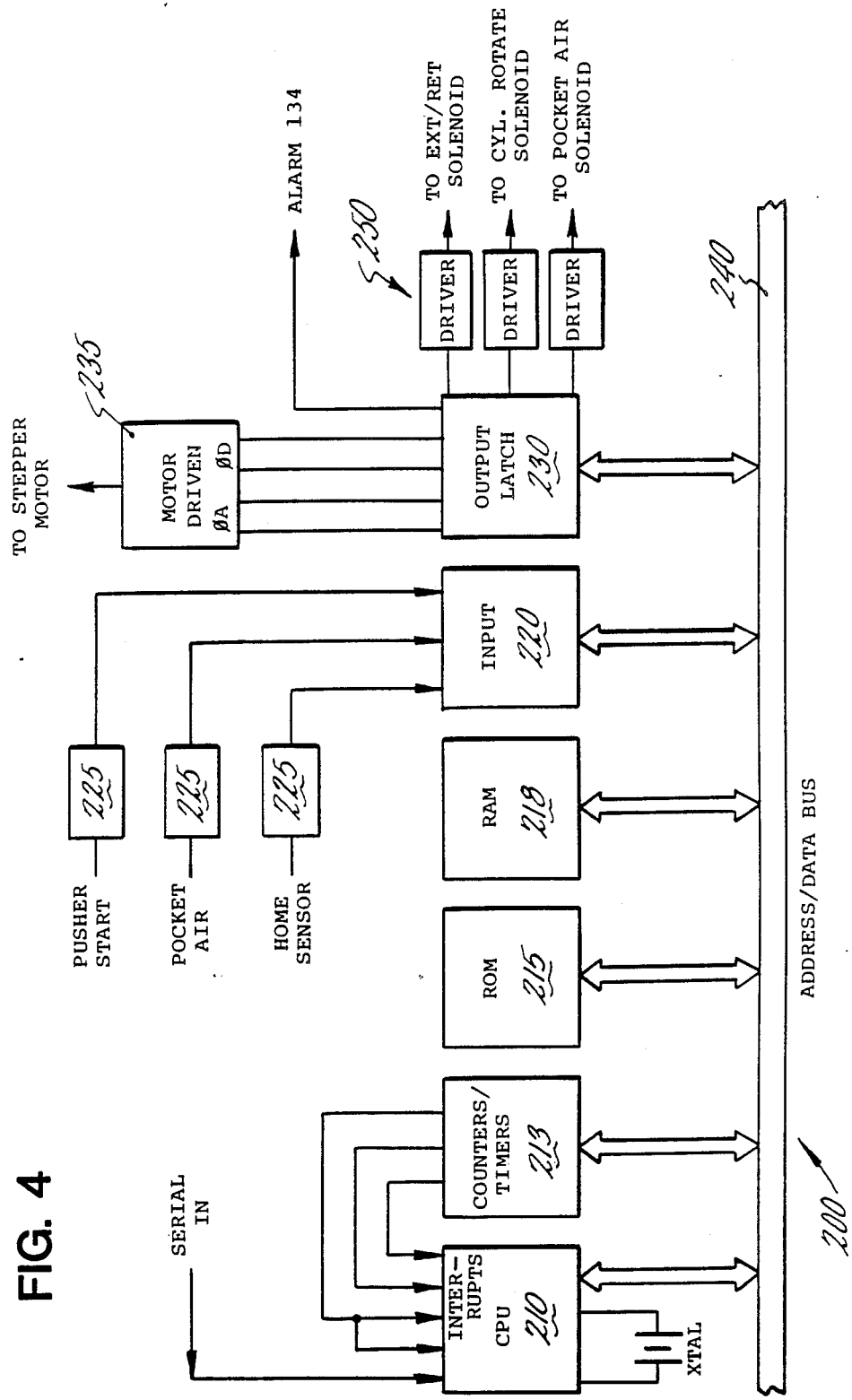
FIG. 4 is a schematic block diagram of the pushout controller of the control system of FIG. 3.

FIG. 4 shows in block diagrammatic form the various functional elements of the dedicated pushout controller 200. In the preferred embodiment of the invention, pusher controller comprises an integrally mounted circuit card 201 which houses a microprocessor, a unipolar chopping stepper motor drive, and other input/output conditioning circuitry. CPU 210 handles serial communication with Machine controller 130, and controls the operation of the other microprocessor elements in accordance with a control program stored in ROM 215. In an operative embodiment of the invention, CPU 210 comprises an 8085 AH microprocessor of Intel Corporation. Serial communication is handled via a differential line receiver (not shown) using the 8085 SID input line. Counter/Timer circuit 213 is connected to the CPU's data/address bus 240. Illustratively, C/T 213 contains three independent programmable counters, the inputs of which are connected to the clock outputs of CPU 210, with the counter/timer outputs connected to the CPU's interrupt inputs. C/T 213 is used for communications synchronization, CPU timing, and motor step timing.

RAM 218 stores the current pusher cam profile and acts as a scratch pad memory for CPU 210. A variety of data mapping techniques well known in the art may be employed for the digital representation of the pusher cam profile within RAM 218. Illustratively, RAM 218 comprises a 1K×8 bit static random access memory integrated circuit. ROM 215, which stores the controller's program code, illustratively consists of a 4K×8 bit Read Only Memory connected to address/data bus 240.

Figure 9:
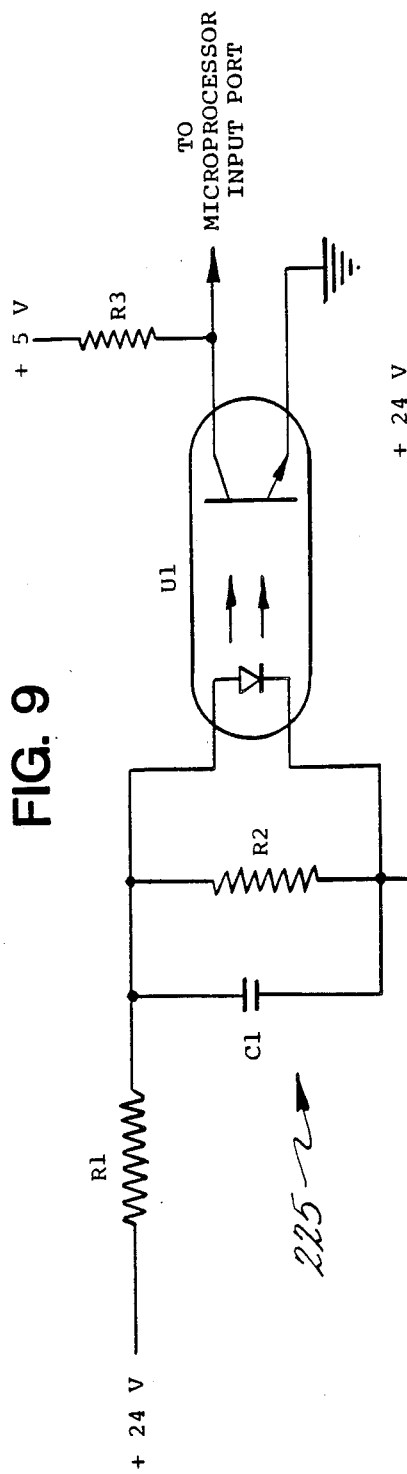
FIG. 9 is a circuit schematic diagram of an opto-isolator input circuit for the pusher controller circuit of FIG. 4.

Input port 220, also connected to address/data bus 240, monitors the status of home sensor 65 (FIG. 5), and receives the pusher start signal and pocket air signal from Section controller 150. Advantageously, the pushout controller 200 includes input signal conditioning circuitry 225, for DC level-translation, isolation, filtering, and noise rejection. An opto-isolator circuit 225 as illustrated in FIG. 9 may be used to provide both electrical isolation and level translation (24 VDC input to 5 VDC CPU signal level). Resistor R2 is selected so that approximately 12 VDC must be present at the input before the microprocessor detects a change at input port 220. Resistor R1 act as a low pass filter to reject high frequency noise. Output latch 230 is connected to CPU 210 via the address/data bus 240. Advantageously, two such latches are provided, one being connected to motor drive circuit 235 to switch on and off various motor phase signals $\phi A$-$\phi D$, the other to solenoid driver circuits 250. Latches 230 provide four bit parallel output ports under the control of CPU 210.

Figure 10:
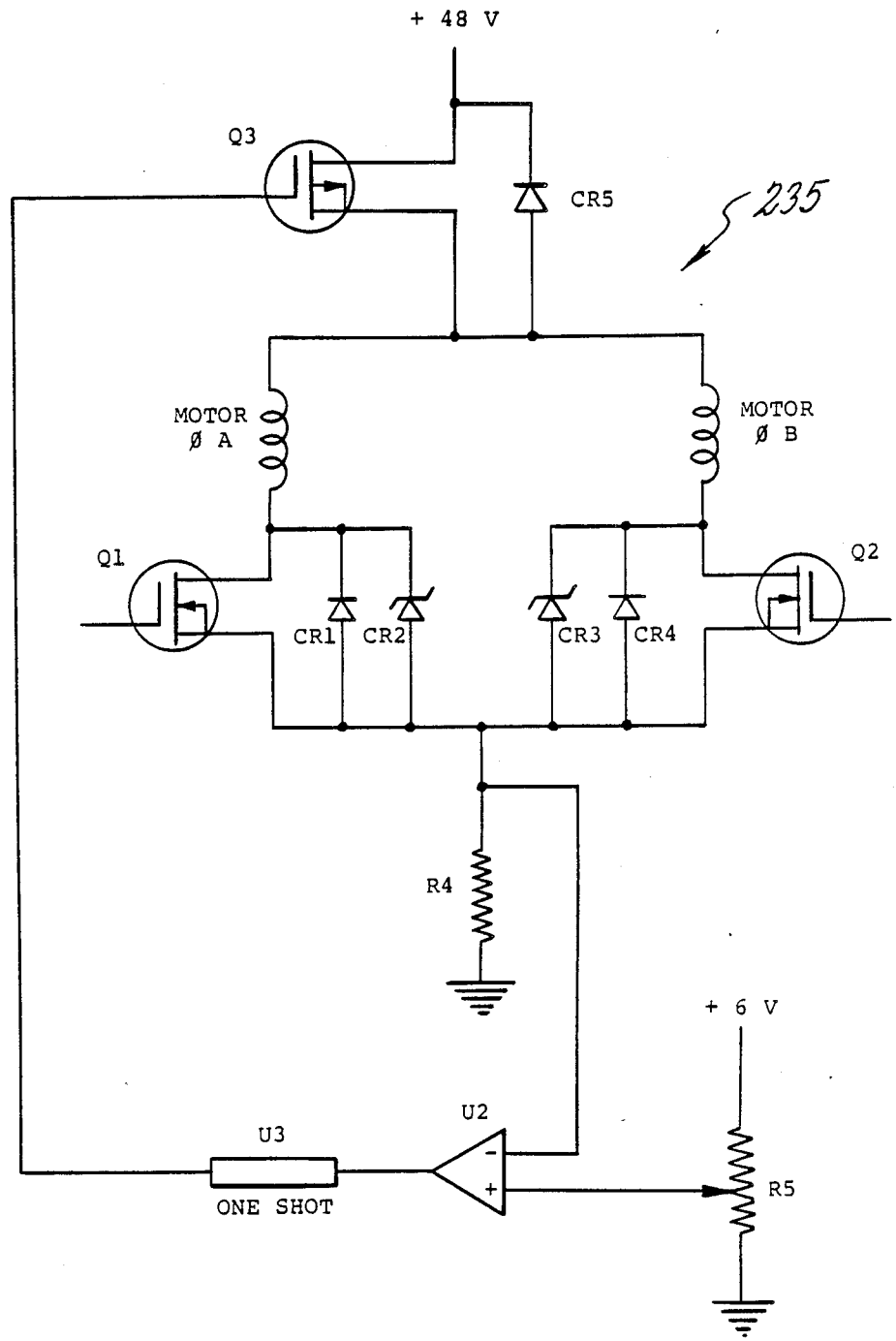
FIG. 10 is a circuit schematic diagram of a motor drive circuit for the pusher controller circuit of FIG. 4.

Illustratively, pusher controller 200 employs a unipolar chopping stepper motor circuit 235 of the type shown in FIG. 10 for driving the stepper motor 60 of FIG. 5. (FIG. 10 shows one half of the drive circuit). Before turning on motor 60 both N-channel phase switches (e.g. driver transistor Q1 and diodes CR1 and CR2) are off and no current flows through resistor R4. P-channel FET Q3 is therefore on at this point. When motor 60 is to take a step, the discrete coil winding for phase A (for example) is energized by changing the gate voltage from 0 VDC to 12 VDC, allowing current to flow through Q1 and Q3. Current will continue to flow through φA until the voltage level across R4 equals the reference voltage established by U2 and R5. When this happens one-shot U3 is triggered to turn off FET Q3 for 0.5 msec. On the timing out of one shot U3, Q5 will be turned back on, and the cycle repeated for as long as the φ A signal is provided by output latch 230 (FIG. 4). This arrangement allows "overdriving" of the stepper motor 60 without large series resistors.

Figure 11:
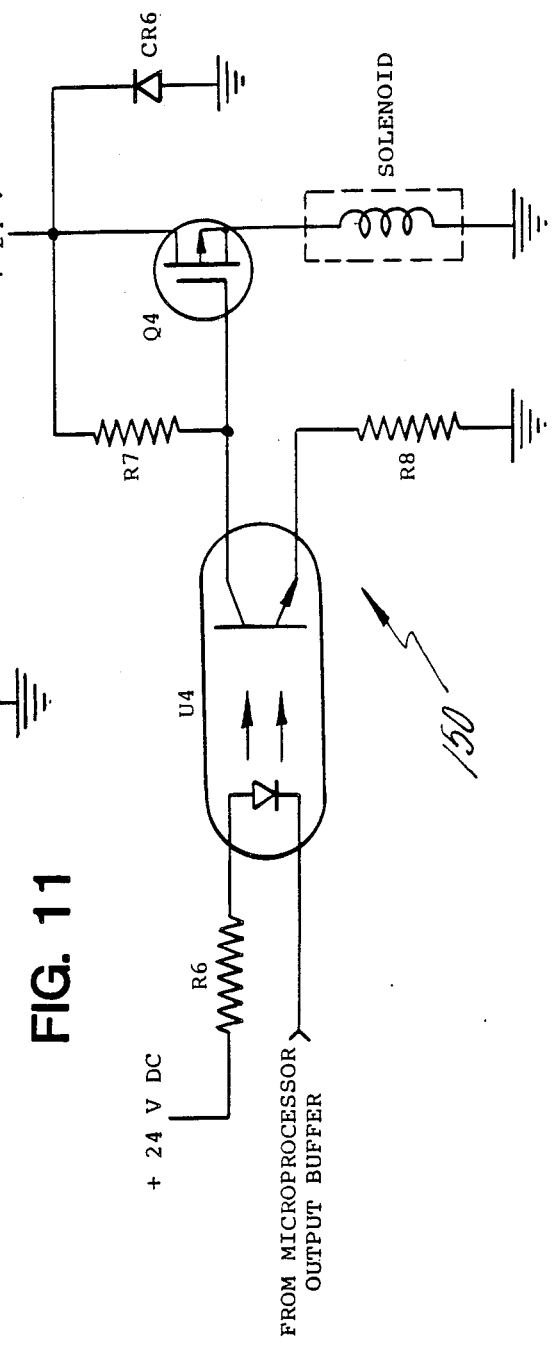
FIG. 11 is a circuit schematic diagram of a solenoid drive circuit for the pusher controller circuit of FIG. 4.

FIG. 11 illustrates an advantageous output driver circuit 250 of the type used to actuate and deactuate the various solenoid valves 91, 93, and 95 (FIG. 3). Output driver 250 converts the microprocessor commands, in the form of 5 VDC signals, to 24 VDC drive signals for the pusher solenoids (up to 1 ampere inductive load). U21 comprises an opto-isolator which is driven by the 5 VDC signal from output latch 230 (FIG. 4). Turning on U21 allows current to flow through R7 and R8, thereby turning on Q5 and energizing the load. Diode CR6 protects switch Q5 from inductive loads.

When the operator wishes to set up and run the pusher control system 100, he depresses the maintenance stop button 116 on machine terminal 110 (FIG. 2), and turns on the power supplies to the various controllers. Table 1 lists in order the displays which are associated with the menu-driven software and are used by terminal 110 for inputting and displaying various data for the pushout control system. Menu selection relies in particular on three keys of terminal 110—the DO key to execute the currently displayed item, the NEXT key for displaying the next item in the menu, and the PREVIOUS key for displaying the previous menu item.

During the setup phase, the user selects various required parameters including the desired cam profile. These may be later modified during operation of pushouts 50 for fine-tuning. Referring to Table 1, the master offset angle represents the number of machine degrees offset from the sync signal of the pushout cycle for each section, which may be adjusted to maximize the container dead plate time. "Pocket air on" gives the number of machine degrees before the start of pushout, while "pocket air off" gives the number of pushout degrees (arcuate degrees) upon which pocket air is turned off; these may be adapted to control the "nesting" and stability of containers held by fingers 83 (FIG. 5). Cam Profile Select (Item B1) enables the user to select the part of number of a desired pushout cam (stepper motor drive profile) from a profile chart. Cam Speed (C1) permits operator variations of pushout speed within certain limits, and may be used to adjust the release of container from the pusher fingers 83 to an outfeed conveyor. Pushout Start (D1) permits fine adjustment of pushout firing order, while Retract Angle (D2) corrects various mechanical problems associated with mistimed finger retract.

After set-up of the pusher controller has been completed, the pushout sections may be started individually by releasing the maintenance stop button 116, selecting the appropriate section under the "Section Status" menu item E1 (Table 1), and turning on Machine controller 130. This commences down loading of data to pushout controller 200.

Figure 7:
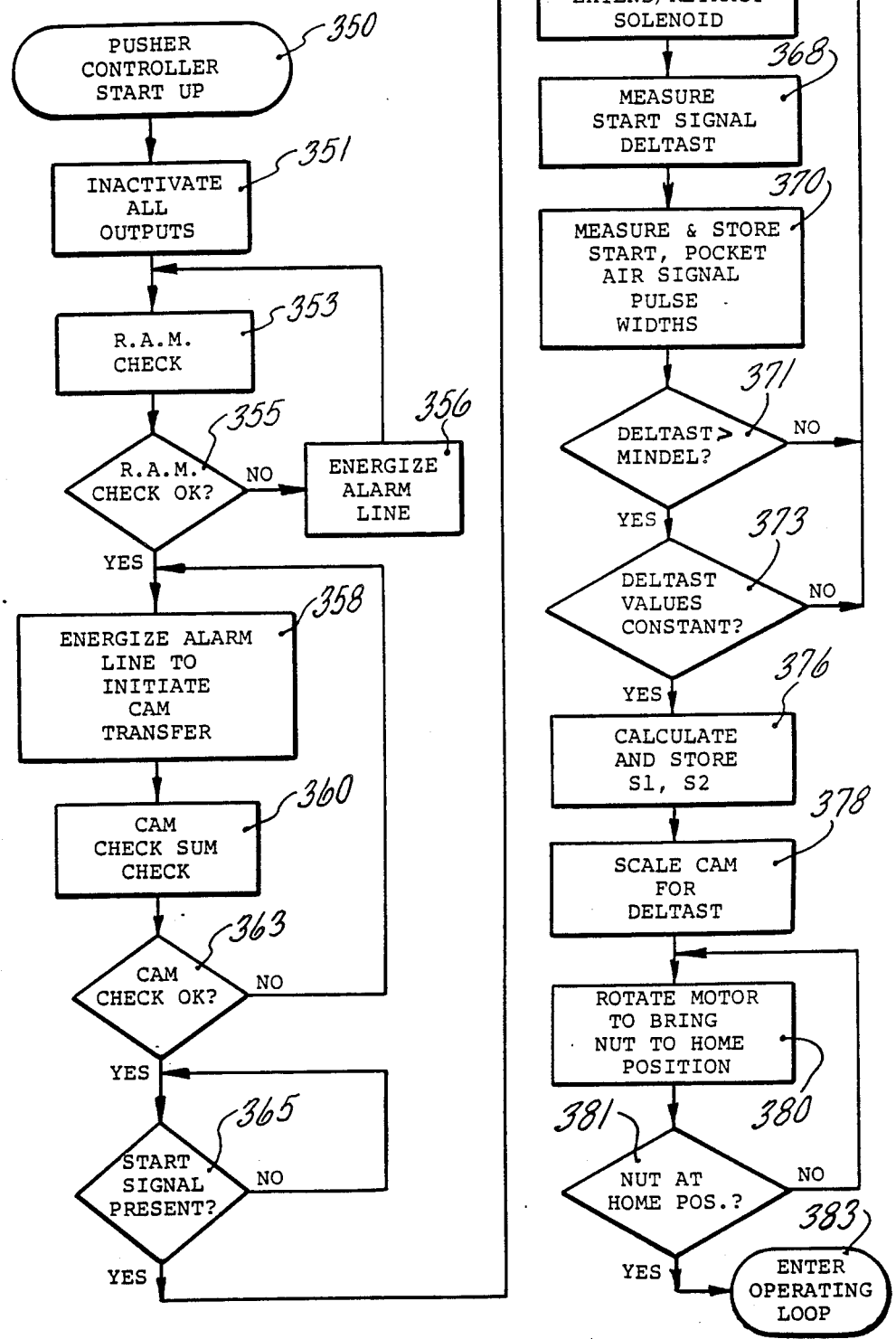
FIG. 7 is a flow chart schematic diagram of a startup routine for the pusher controller.

FIG. 7 is a block schematic diagram of the startup routine of the pusher control program in ROM 215 (FIG. 4). When power is applied to the microprocessor, the following intializing steps occur:
(1) All solenoid valves are turned off.
(2) RAM check (3) The alarm line 134 rises to 24 VDC and remains on for 100 ms.
(4) In response to (3) the Machine controller 130 transmits a cam and related information
(5) The cam is checked for validity; the routine reverts to (3) above if the cam is found invalid.
(6) Upon receiving a valid cam, Pushout Controller 200 is initialized and will wait for signals from the Section controller 150 on the pocket-air and pushout start signal lines.

When a given Pushout Controller 200 detects a rising edge on the pusher start input line 154, it actuates the extend/retract solenoid valve, then measures DELTAST, the time between two rising edges of the pusher start pulses (step 368). Pulse widths of the pocket air and pusher start signals are also measured at 370. Using the measured value for DELTAST, which is machine cycle time, and the measured pulse widths, the "pocket air on time" and "finger retract time" are each calculated using the following formula:

$$S = \frac{\Delta T}{T} * N$$

where
S = number of motor steps until event
ΔT = pulse width time
T = machine cycle time
N = number of motor steps in 90° pusher rotation The pulse width of the pocket air signal is used to communicate the number of degrees of arcuate motion through which the pusher cylinder must rotate before pocket air is turned off.

TABLE I
PUSHOUT MENU SELECTION

A. Machine Data
  A1. Master Offset
  A2. Pocket Air On
  A3. Pocket Air Off
  A4. Number of Pushout Sections
  A5. Firing Order
B. Cam Profile Select
  B1. Profile - Selection Table
C. Cam Speed
  C1. Cam Sweepout Time Variation
D. Event Table
  D1. Pushout Start Angle
  D2. Retract Angle
E. Section Status
  E1. Pushout Section on/off
F. Alarms
  F1. Number of Alarm Conditions
  F2. Alarm Messages Similarly, the pulse width of the pusher start signal is used to communicate the number of degrees of arcuate motion through which the pusher must rotate before the pusher fingers are retracted. The above formula is used to calculate the number of motor steps associated with pocket air off (S1) and finger retract (S2). Thus, with reference to the timing diagrams of FIGS. 6A–6F, the pulse width T1 of the Section controller pocket air signal 300 (FIG. 6A) determines the cut-off time S1 of the Pusher Controller pocket air signal (FIGS. 6E, 6F). The pulse width T2 of the pushout start signal 310 (FIG. 6B) determines the cut-off time S2 of the extend- /retract signal (FIGS. 6C, 6F); both S1 and S2 are within the "sweepout" phase 410 of the arcuate motion profile. Note that the pulse widths are used to communicate information only via the above formula, and no real time event is associated with the falling edges of the pusher start and pocket air pulses 300, 310.

DELTAST is measured between the first and second pusher start pulses, and between the second and third, at 368. These measurements are tested at 371, 373 to determine whether the cycle time exceeds a required minimum MINDEL, and whether the successive DELTAST measurements are substantially equal ($\pm 2\%$). If these tests are passed, the program calculates and stores S1 and S2 according to the above formula, and scales the entered cam profile according to the machine cycle time (DELTAST). The microprocessor then instructs the motor 60 to rotate nut 53 to its home position, and when this is verified at 381, enters the operating loop.

Figure 8:
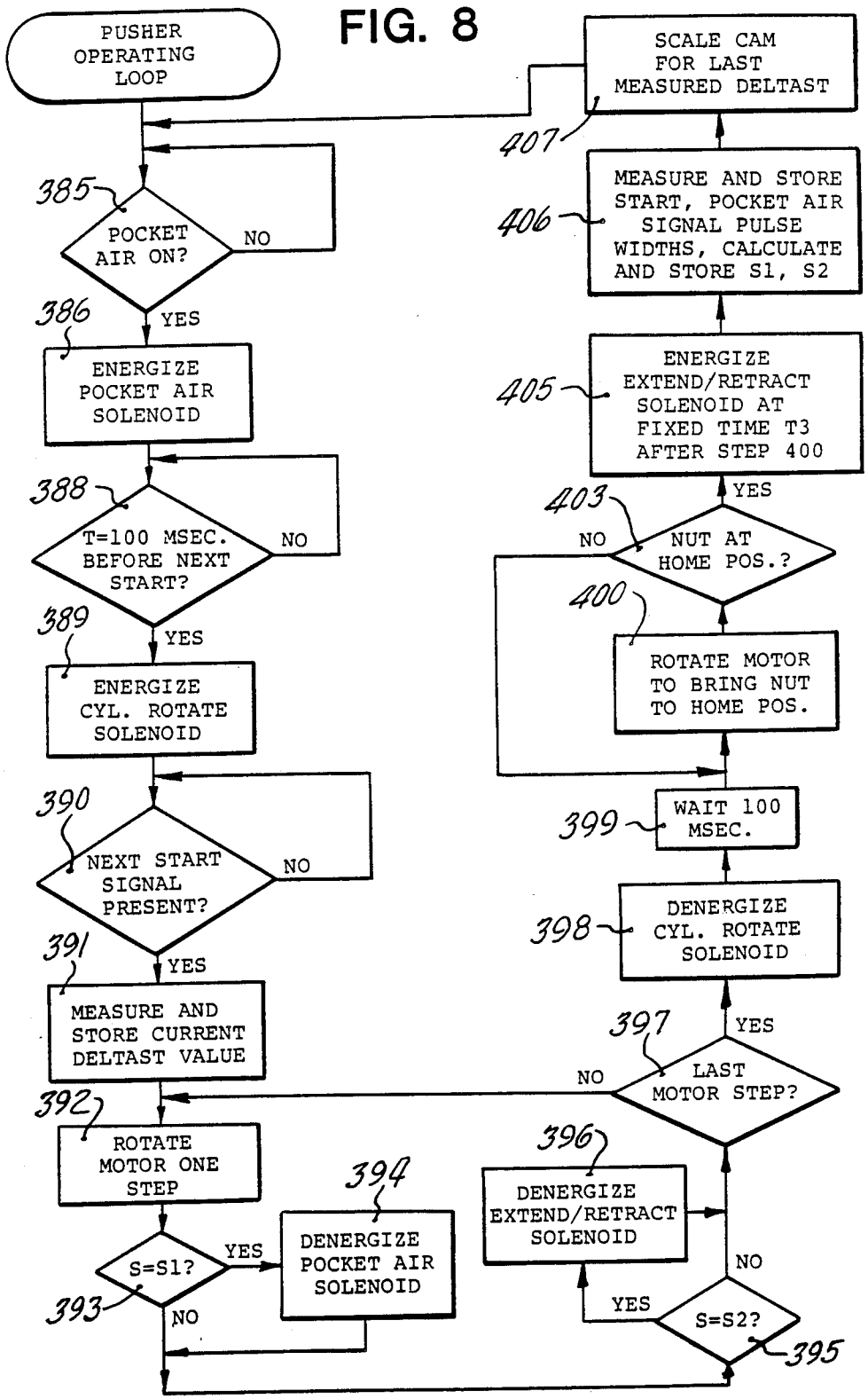
FIG. 8 is a flow chart schematic diagram of an operating routine for the pusher controller.

FIG. 8 sets forth the operating steps which are repeated at each pushout control cycle (see the timing diagrams of FIGS. 6A–6F). At 385-6 the pocket air solenoid is energized upon detecting the rising edge of the "pocket air" signal. At 388-9 the cylinder rotate valve is energized in anticipation of the next "pusher start" signal. When this signal is detected, the microcomputer measures and stores the current DELTAST value—i.e. the time between the current start signal's rising edge and the last one received and stored.

The loop comprising steps 392–397 rotates the pusher cylinder according to the newly scaled cam profile. When the pushout rotates the proper number of degrees, pocket air is turned off (at motor step S1), and the fingers are retracted (at motor step S2). When the pusher has rotated completely, the microprocessor switches the cylinder rotate solenoid to allow the pusher cylinder 70 to return, then (after an interval) instructs the motor to return the nut to its home position. After a fixed time T3 has elapsed since commencing reverse rotation of motor 60, the extend/retract solenoid 95 is energized to extend fingers 83. The "pocket air" and "pusher start" signals are again measured, to calculate and store S1 and S2, and the cam is rescaled for the last-measured value of DELTAST. This prepares the system for the next cycle.

If during normal operation pushout motor 60 is unable to rotate due to an internal or external jam, the microprocessor will react according to the scheme:

(1) De-energize extend/retract solenoid.
(2) De-energize cylinder rotate solenoid.
(3) Step motor 60 to attempt to move the nut to its home position, until successful.
(4) Resume normal operation upon next start signal.

The dedicated pushout control system discussed above illustrates the basic principles of the invention in a particular system architecture (FIG. 3), dedicated controller design (FIG. 4), and suitable set-up and operating procedures. These may be appropriately extended to systems combining the universal controller architecture of FIG. 1, and similar architectures, with other types of dedicated mechanism controller. For example, the pushout controller 200 has been illustrated in the context of a given set of inputs and outputs to mechanism controller 200—solenoid valve driver and motor driver outputs, and home position sensor inputs. Such mechanism controllers may be applied to a wide variety of digital, analog, and serial inputs and outputs (including both control and communication devices). Illustrative control and communication devices include push buttons, pilot lights, solenoid valves, motors, control valves, process control transmitters (for temperature, pressure, etc.), keyboards, alphanumeric displays, etc.

Figure 12:
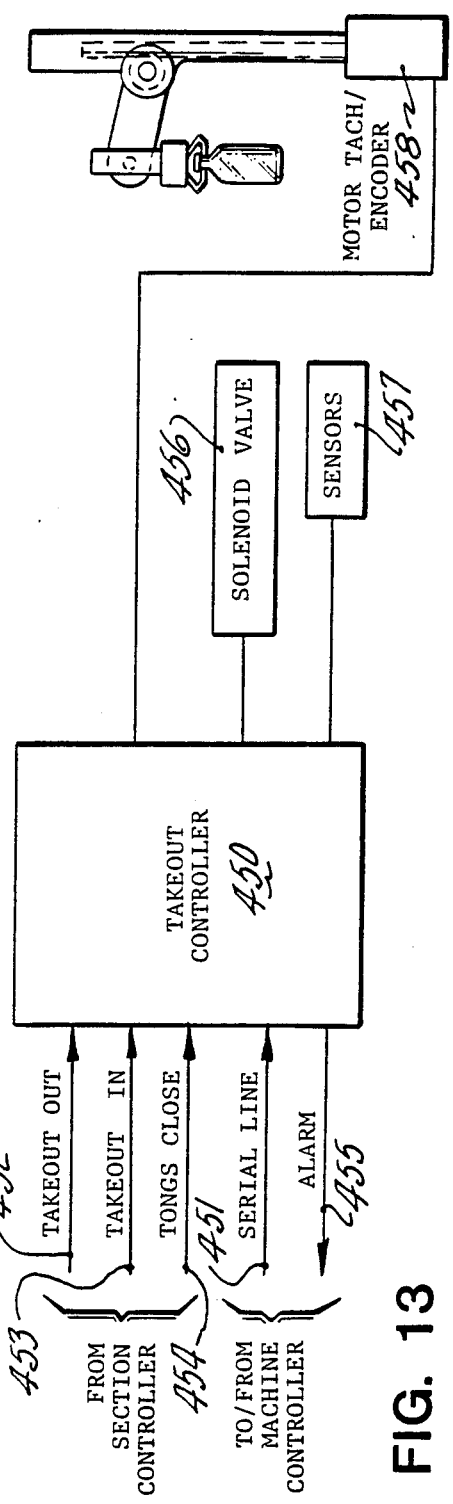
FIG. 12 is a schematic block diagram of a dedicated mechanism controller for a takeout mechanism.

FIG. 12 illustrates a mechanism controller 450 dedicated to the control of a takeout assembly of a glassware forming machine. Takeout controller 450 includes a serial line 451 which communicates with the machine controller, and a series of timing signal lines 452–454 which transmit signals from a section controller (not shown). Advantageously, lines 452–454 transmit Takeout Out, Takeout In, and Tongs Close signals, respectively, for real time control of the primary takeout actions. The actual motion profile of the takeout arm is governed by takeout controller 450, by means of parameter or table data downloaded via serial line 451. An appropriate program for the takeout arm trajectory could take into account predetermined dimensions and other physical characteristics of the glassware article for a given job, such data being entered by the user at machine terminal 110 (FIG. 1).

Takeout controller 450 can also monitor its own status and the status of the controller takeout assembly, including such information as motor current, air pressure, and mechanism failure modes. Such information could be obtained from one or more sensors 457 and used to diagnose or anticipate operational problems. For example, a deviation of the motor current (measured at 458) from its normal range might indicate mechanism wear or a binding problem before a failure actually occurs. Other alarms might be reported via alarm line 455 after the mechanism has failed. Such information would help the operator determine the cause of the malfunction and take appropriate corrective action.

Figure 13:
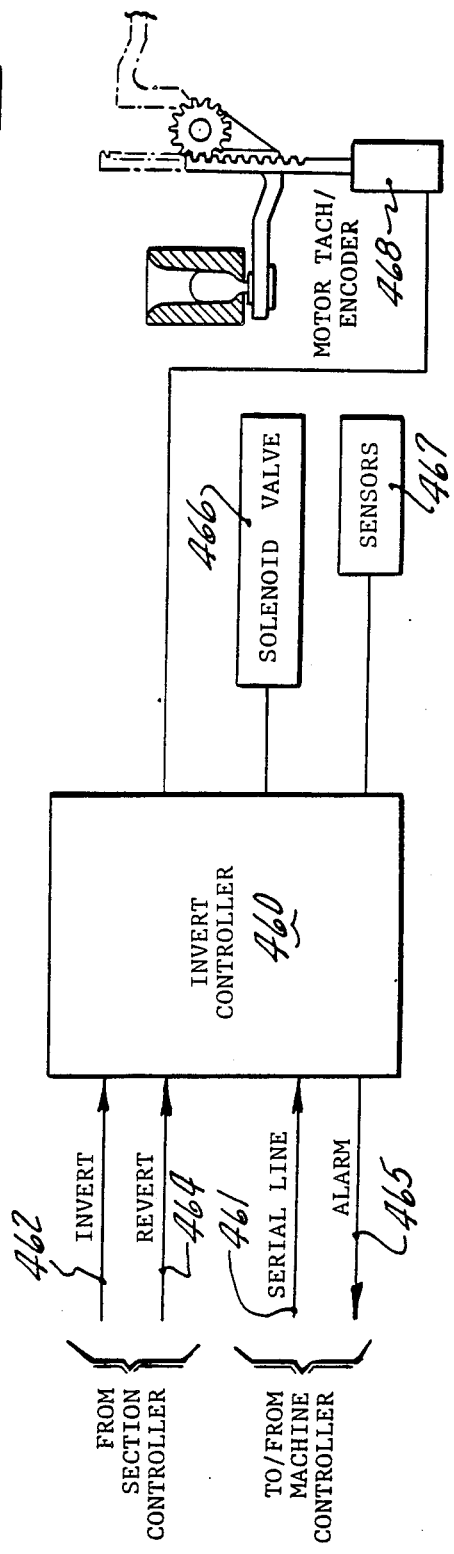
FIG. 13 is a schematic block diagram of a dedicated mechanism controller for an invert mechanism.

FIG. 13 illustrates still another mechanism controller 460, for an invert assembly. Real time control signals 462, 463 include invert and revert signals. Controller 460 would operate similarly to takeout controller 450, discussed above.

While reference has been made above to specific embodiments, it will be apparent to those skilled in the art that various modifications and alterations may be made thereto without departing from the spirit of the present invention. Therefore, it is intended that the scope of this invention be ascertained by reference to the following claims.

We claim:

1. In a glassware forming machine of the type including a plurality of machine sections each having a set of machine components for receiving gobs of molten glass and molding the glass into glassware articles, said sections operating in phased relationship within cycles of operation, an electronic control system for controlling the operation of said machine components comprising:
a section controller, for generating a series of timing signals for at least one section to define actuation and deactuation times within the machine cycle;
a machine controller for providing set-up parameters representative of operational set-up information for at least one of said machine components;
at least one mechanism controller for a given machine section, for controlling the operation of a given machine component thereof, said mechanism controller containing:
a control program for that component;
a processor;

timing input port means for receiving the timing signals from said section controller;

set-up input port means for receiving the set-up signals from said machine controller;

and input interface means for providing actuating signals to at least one machine component, wherein said control program processes said timing signals in accordance with the set-up parameters to produce at least one control signal for the machine component;

a bidirectional asynchronous communications link between said machine controller and said mechanism controller, for passing set-up parameter signals from said machine controller to said mechanism controller, and for passing alarm signals from said mechanism controller to said machine controller (1) to signal alarm conditions identified by said control program or (2) to cause said machine controller to download said setup parameters.

2. Apparatus as defined in claim 1 further comprising a machine terminal for entering, displaying, and modifying said actuation and deactuation times and said set-up parameters.

3. Apparatus as defined in claim 1 wherein said asynchronous communication link is a multidrop, bidirectional link, and passes mechanism processor status signals to said machine controller.

4. Apparatus as define in claim 1 including a plurality of said section controllers, each for a corresponding machine section.

5. Apparatus as defined in claim 1, further comprising an electronically responsive valve block assembly for actuating and deactuating valves in response to timing signals from said section controller, to operate at least one fluidically driven machine component.

6. Apparatus as defined in claim 1 wherein said control signal comprises activating and deactivating signals to a solenoid valve.

7. Apparatus as described in claim 1 wherein said control signal comprises a motor controller drive signal, and said mechanism further comprises means for storing a digital motor control drive profile.

8. Apparatus as defined in claim 1, wherein the bidirectional, asynchronous communications link is a serial line.

9. For use with an electronic control system for a glassware forming machine, said forming machine including a plurality of machine sections each section having a plurality of machine components operating in phased relationship within a machine cycle for receiving molten glass and molding glassware articles therewith, said control system including at least one section controller for producing timing signals representing actuating and deactuating times of machine components of at least one section of said forming machine, and a machine controller for providing set-up information for said machine components, a mechanism controller for a given machine component of a given section of said forming machine, said mechanism controller comprising:

a processor;

set-up input port means for receiving set-up parameters sent asynchronously from said machine controller;

timing input port means for receiving timing signals from said section controller;

output port means for outputting alarm signals to be sent asynchronously to said machine controller;

output interface means for outputting control signals to said machine component in response to commands from said processor;

non-volatile control program memory means for storing a control program for said processor, responsive to at least one of said timing signals and to said set-up parameters, to define control outputs to said machine component, said control program being designed to initiate alarm signals from said mechanism controller to said machine controller to indicate predefined alarm conditions or to request downloading of data from said machine controller, and being further designed to interpret set-up parameters downloaded from said machine controller to said mechanism controller.

10. Apparatus as defined in claim 9 wherein said asynchronous communication link is a multidrop, bidirectional link, and passes mechanism processor status signals to said machine controller.

11. Apparatus as defined in claim 9 wherein said output interface provides a motor controller drive signal, and said mechanism controller further comprises means for storing a digital motor control drive profile.

12. Apparatus as defined in claim 9 wherein said output interface provides activating and deactivating signals to a solenoid valve.

13. Apparatus as defined in claim 9 wherein the input and output ports are serial ports.

14. For use with an electronic control system for a glassware forming machine, said forming machine including a plurality of machine sections each section having a plurality of machine components operating in phased relationship within a machine cycle for receiving molten glass and molding glassware articles therewith, said control system including at least one section controller for producing timing signals representing actuating and deactuating times of machine components of at least one section of said forming machine, and a machine controller for providing a plurality of set-up parameters for said machine components, a mechanism controller for a given machine component of a given section of said forming machine, said machine component having an associated sensor for detecting at least one predetermined condition of the machine component and for producing a signal in response thereto, said mechanism controller comprising:

a processor;

set-up input port means for receiving set-up parameters sent asynchronously from said machine controller;

timing input port means for receiving timing signals from said section controller;

output port means for outputting alarm signals to be sent asynchronously to said machine controller;

output interface means for outputting control signals to said machine component in response to commands from said processor; and non-volatile control program memory means for storing a control program for said processor, responsive to at least one of said timing signals and to said set-up parameters, to define control outputs to said machine components, and to initiate alarm signals to said machine controller via said output port means to signal predefined alarm conditions.

* * * * *